(12) United States Patent
Lei et al.

(10) Patent No.: US 6,631,371 B1
(45) Date of Patent: Oct. 7, 2003

(54) DATABASE FINE-GRAINED ACCESS CONTROL

(75) Inventors: Chon Hei Lei, San Leandro, CA (US); Douglas James McMahon, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/247,323

(22) Filed: Sep. 18, 2002

Related U.S. Application Data

(63) Continuation of application No. 09/167,092, filed on Oct. 5, 1998.

(51) Int. Cl.$^7$ .............................................. G06F 17/30
(52) U.S. Cl. ...................... 707/4; 707/2; 707/3; 707/5; 707/9
(58) Field of Search ...................... 707/1–6, 100–103 R, 707/103 Y, 500, 526, 529–530

(56) References Cited

U.S. PATENT DOCUMENTS

| | | | |
|---|---|---|---|
| 5,265,221 A | | 11/1993 | Miller |
| 5,276,901 A | | 1/1994 | Howell et al. |
| 5,428,778 A | | 6/1995 | Brookes |
| 5,751,949 A | | 5/1998 | Thomson et al. |
| 5,765,154 A | * | 6/1998 | Horikiri et al. ................ 707/10 |
| 5,787,428 A | | 7/1998 | Hart |
| 5,815,574 A | * | 9/1998 | Fortinsky .................... 713/153 |
| 5,940,818 A | | 8/1999 | Malloy et al. |
| 6,026,388 A | * | 2/2000 | Liddy et al. .................... 707/1 |
| 6,134,549 A | | 10/2000 | Regnier et al. |
| 6,275,824 B1 | | 8/2001 | O'Flaherty et al. |
| 6,308,273 B1 | * | 10/2001 | Goertzel et al. ............. 713/201 |
| 6,363,387 B1 | | 3/2002 | Ponnekanti et al. |

* cited by examiner

*Primary Examiner*—Alford Kindred
(74) *Attorney, Agent, or Firm*—Hickman Palermo Truong & Becker LLP; Brian D. Hickman

(57) ABSTRACT

A method and mechanism are provided for accessing data. Values are stored for a set of context attributes associated with a session between a database user and a database server. The database system includes an attribute setting mechanism that selectively restricts access to the set of context attributes based on a policy. During the session, the database server executes a query that contains a reference to one or more of the context attributes. For example, the query may contain a predicate that requires a comparison between a context attribute value and a constant. The database server processes the query based on current values of the one or more of the context attributes referenced in the query. A mechanism is also provided for dynamically attaching predicates to queries, where the predicates are attached based on a policy. For example, the database system detects that a query is issued against a database object. Prior to executing the query, a policy function associated with the database object is invoked. The policy function creates a modified query by selectively adding zero or more predicates to the query based on a policy associated with the database object. The modified query is then executed.

38 Claims, 3 Drawing Sheets

DATABASE FINE-GRAINED ACCESS CONTROL

RELATED APPLICATION

This application is a continuation of and claims priority to U.S. application Ser. No. 09/167,092, filed on Oct. 5, 1998, entitled "Database Fine-Grained Access Control", by Chon Hei Lei and Douglas James McMahon, the entire disclosure of which is hereby incorporated by reference for all purposes as if fully set forth herein.

FIELD OF THE INVENTION

The present invention relates to database management systems and, more particularly, to controlling access to information within database management systems.

BACKGROUND OF THE INVENTION

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

For various reasons, it may not be desirable for all users to have access to all of the rows of a particular table. For example, some rows in a table may contain text in English, while other rows contain text in Spanish. In this case, it would be convenient to limit the access of English-speaking users to the rows containing English, and the access of Spanish-speaking users to the rows containing Spanish.

It may also be desirable to restrict access to certain rows for security reasons. For example, certain rows of a table may contain top secret information, other rows may contain secret information, while other rows contain unclassified information. Under these conditions, the rows made available to any given user should be dictated by the security clearance of that user.

Both of the situations described above require row-level filtering of data, and the second situation also requires that the filtering enforce an access-control policy. To enforce row-level access-control policies, a database server must have a mechanism for restricting users to particular subsets of the rows within tables. One technique for implementing row-level access-control policies involves causing all access to a table to be performed indirectly through "views".

A view is a logical table. As logical tables, views may be queried by users as if they were a table. However, views actually present data that is extracted or derived from existing tables. A view is defined by metadata referred to as a view definition. The view definition contains mappings to one or more columns in the one or more tables containing the data. Typically, the view definition is in the form of a database query. Columns and tables that are mapped to a view are referred to herein as base columns and base tables of the view, respectively.

To restrict a user to a particular subset of rows within a table, the user may be granted rights to access a view that extracts from the table only those rows that belong to that particular subset. For example, assume that a table "t" has two columns "text" and "lang". The "text" column of each row stores textual information, and the "lang" column of each row stores data indicating the language of the text of that row. Under these conditions, English speaking users may be restricted to accessing table "t" through a view defined as follows:

V1:
   SELECT * from t
   WHERE t.lang='English' while Spanish speaking users may be restricted to accessing table "t" through a view defines as follows:

V2:
   SELECT * from t
   WHERE t.lang='Spanish'

Each of these view definitions contain a WHERE clause that specifies conditions that restrict the rows of table t that are retrieved by the views. These conditions are referred to as the "predicates" of the view definitions.

Views offer a convenient way to provide row-level access control when the users fall into a relatively small number of categories. For example, if users are categorized solely on the basis of language and only two languages are supported, then only two views need to be created. However, many access policies require users to be divided into a large number of categories based on multiple criteria.

For example, an access policy may require access to be determined based on a user's language, security clearance, and department. If the database system supports 20 languages, 5 security clearance levels, and 15 departments, the number of views required to implement the access policy would be 20*5*15=1500. For example, the view that would be used by English speaking users with security clearance of 3 that belong to the Insurance department may be defined as follows:

V3:
   SELECT * from t
   WHERE t.lang='English'
   AND t.security_level<=3
   AND t.dept='Insurance'

View V3 uses "hard-coded" literals, such as 'English', 3, and 'Insurance'. The use of hard-coded literals in view definitions can have serious performance implications. Specifically, the use of literals renders similar queries (that would otherwise be able to share query plans and resources) into distinct queries that can share no resources.

In some cases, access policies may dictate that every individual is to be treated differently. For example, an access policy may dictate that every user is only able to access rows that contain his or her user_id. Under these circumstances, a separate view would have to be created for every user. The view for a particular user would, for example, be defined as follows:

V4:
   SELECT * from t
   WHERE t.user_id=5837392

Under certain conditions, the proliferation of views may be avoided through the use of bind variables. This requires that the database application issue SQL containing bind variables, such as in the following example:

V5:
   SELECT * from t
   WHERE t.user_id=:BINDVAR

In the query V5, BINDVAR is a bind variable that may be set to a value by the user prior to submitting the query V5. For example, the user that has the user_id of 5837392 can set BINDVAR to 5837392 prior to accessing data using query V5. In this case, query V5 would extract from table t the same rows as the query that defines view V4, in which the user_id value is hard-coded.

Note that the bind variable solution depends entirely on ubiquitous coding in the database application itself. This is not only potentially weaker from a security standpoint, but it is tedious and difficult to code for the application programmers.

Because each user can tailor query V5 by setting BINDVAR to his or her own user_id, only one query is required to implement a policy that would otherwise have required one view per user.

Unfortunately, if the user with the user_id of 5837392 can set BINDVAR to 5837392, then it may be possible for other users to do so as well. When bind variables are used in queries that implement an access policy, the entity that has power to set the bind variables typically also has the power to violate the policy. In many instances, the entity that sets the bind variables is a database application. If the database application is not secure, or if it is possible for users to circumvent the database application, then the data protected by the access policy is not secure.

Another approach to avoid the use of multiple views to implement an access control policy involves the use of a "session" table. When a session is started, a row is added to the session table for the newly started session. The row indicates the session_id of the new session, as well as any other values that are factors used in the access control policy. For example, the session table entry may include the user_id, language, and department of the user that has established the session. All users are then required to access the protected table through a view that performs a join between the session table and the protected table. Such a view may be defined as follows:

V6:
   SELECT * from t, session
   WHERE t.lang=session.lang
   AND t.dept=session.dept
   AND session.session_id=CURRENT_SESSION_ID where CURRENT_SESSION_ID is a value from a session pseudo-column that is set to the session id of the session in which the view is being accessed.

The session table approach has some significant drawbacks. For example, the extra join with the session table can severely affect the efficiency of query execution. In addition, the maintenance of the session table is difficult. For example, simply cleaning up the table to remove sessions that are no longer active can be problematic, especially if a client session were to terminate abnormally and thus not execute any required closing logic.

In addition to the problem of view proliferation, another problem associated with using views to implement an access policy is that not all policy rules can be easily evaluated by the database server. For example, if the access control policy is "a user accessing the EMP table as a Payroll clerk through the Payroll application is allowed to see all EMP information, including SALARY, but only for employees in her division," then views will probably not be able to implement the policy, since the database server will not be able to determine what application a user is using.

Another problem associated with using views to implement an access control policy is that, frequently, users need at least query access to base tables. Users who have privileges on base tables are able to bypass the security enforcement provided by views.

Another problem associated with using views to implement an access control policy is that it can make the access control policy extremely difficult to administer. For example, when a security rule is added, changed, or removed, it may be very difficult to figure out what exactly must be done with each view. An administrator cannot tell whether changing security policies (for example, by altering or dropping a view) will break a database application.

Based on the foregoing, it is clearly desirable to provide a mechanism for implementing access control policies within a database, where the mechanism (1) does not severely impact the efficiency of query execution, (2) does not rely on users to access data through a particular view or set variables to the appropriate values, (3) supports relatively complex access control rules, and (4) does not make access control management impracticably complex.

SUMMARY OF THE INVENTION

A method and mechanism are provided for accessing data. According to one aspect of the invention, a session between a database client and a database server is initiated. Values are stored for a set of context attributes associated with the session. The values may be stored, for example, in server-side volatile memory that is allocated specifically for the session. The database system includes an attribute setting mechanism that selectively restricts access to the set of context attributes based on a policy. The policy may specify, for example, that certain context attributes cannot be set by the client, that certain other context attributes may be set only to certain values by the client, and that certain other context attributes may be freely set to any values by the client.

During the session, the database server executes a query that contains a reference to one or more of the context attributes. For example, the query may contain a predicate that requires a comparison between a context attribute value and a constant. The database server processes the query based on current values of the one or more of the context attributes referenced in the query.

According to another aspect of the invention, a mechanism is provided for dynamically attaching predicates to queries, where the predicates are attached based on a policy. For example, the database system detects that a query is issued against a database object. Prior to executing the query, a policy function associated with the database object is invoked. The policy function creates a modified query by selectively adding zero or more predicates to the query based on a policy associated with the database object. The modified query is then executed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for controlling access to data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
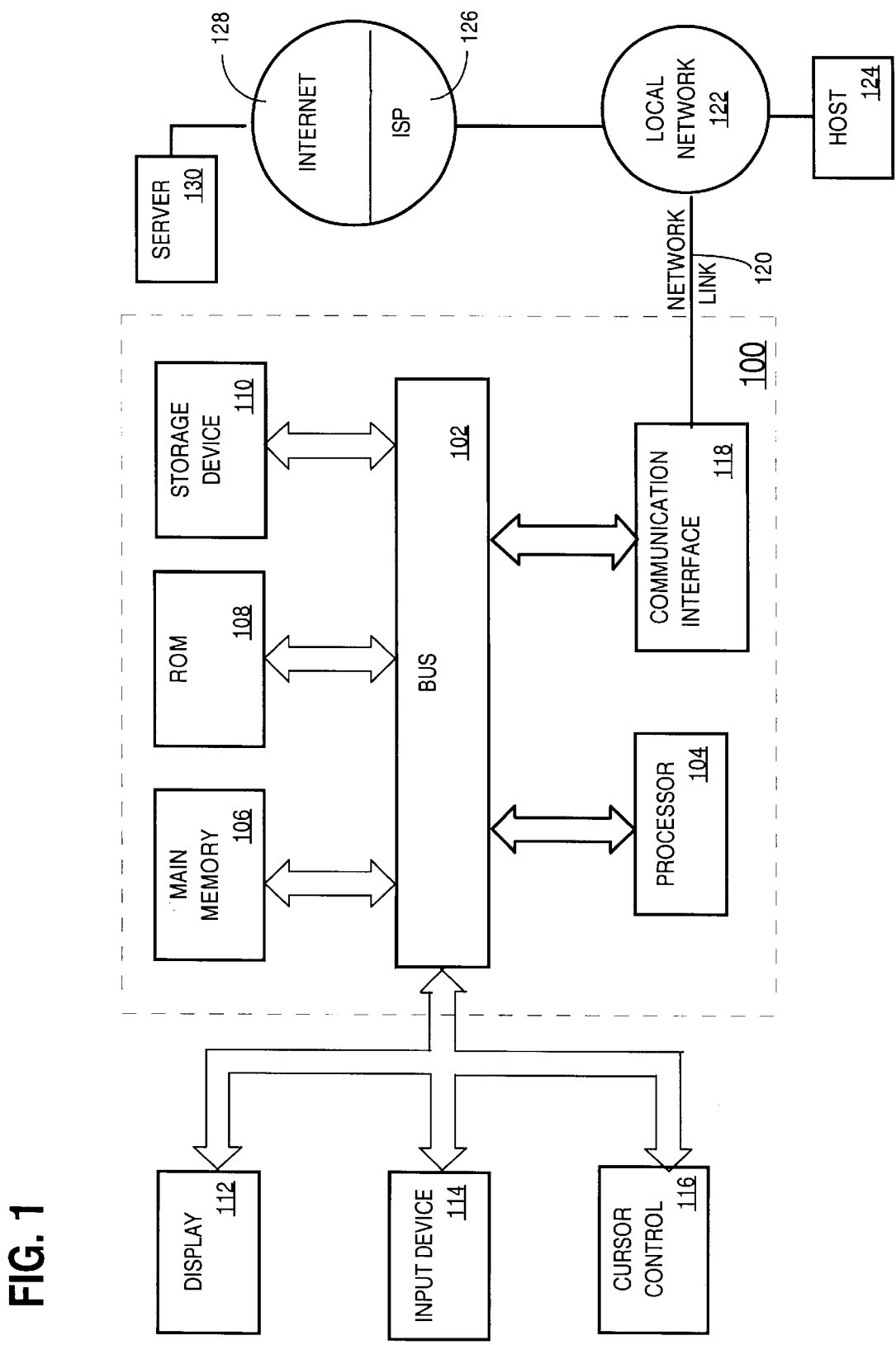
FIG. 1 is a block diagram of a computer system on which embodiments of the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for controlling access to data. According to one embodiment of the invention, a mechanism for controlling access to data is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

Functional Overview

According to one aspect of the present invention, a GetContextValue function is provided. The GetContextValue function is a function that can be referenced in a predicate of an SQL statement in the same manner that a bind variable is referenced. For example, an SQL statement may contain the condition "WHERE GetContextValue (today)='Friday'".

According to one embodiment, the GetContextValue function differs from regular user defined functions in that the GetContextValue is a "built in" function of the database server. The reason that GetContextValue can be referenced in the same manner as a bind variable is that it is only executed once in a query, even though the query may filter thousands of rows. For example, consider the following two queries:

select employee_name from employee
        where department=My_department(USER_ID);
    select employee_name from employee
        where department=GetContextValue(context_of_
          my_department);

In the first of the queries, My_department is a user defined function to get the department number for the user with USER_ID. In the second query, the GetContextValue function is invoked to retrieve the value of a context variable that indicates the department number of the current user.

These two queries could produce the same results with significantly different levels of performance. The performance difference may be vast if the employee_name table is large (e.g. has tens of thousands of rows). In the query that invokes the user defined My_department function, the function has to be executed before evaluation of the predicate for every row fetched, because the server has no idea what is in the function and therefore cannot determine whether this function will return the same value after each fetch.

In contrast, when processing the query that invokes the GetContextValue function, the server knows that GetContextValue will return the same cached value during every fetch, so it will only execute the function once.

If department is a indexed column, the execution plan for the query that calls the My_department function will still be a full table scan, but it will only be an indexed lookup for the query that invokes GetContextValue.

While bind variables allow client applications to provide values to be used in predicates, the GetContextValue() function provides values of "context attributes" which, according to one embodiment, are maintained in memory that the server allocates for a particular session. The values for context attributes may be gathered by the database system, or set by a client application. For example, the database system may gather the "today" attribute value by reading a system clock. Values for other system attributes, such as "language", may be specified by the user/client application.

The specific context attribute value returned by the GetContextValue function is determined by its input parameter. In the example given above, "today" is the input parameter value. Therefore, the invocation of the GetContextValue function returns the value associated with the "today" context attribute.

Specifically, when evaluating the predicate "WHERE GetContextValue(today)='Friday'", the database server calls the GetContextValue routine, passing "today" as an input parameter. In response to being called, the GetContextValue routine returns the value of the "today" context attribute to the database server. The database server then proceeds to execute the query, binding the "today" attribute value to the predicate.

According to another aspect of the invention, GetContextValue predicates are used to provide security. Therefore, clients are allowed to set context attributes only indirectly by calling a trusted SetAttribute mechanism within the database system. The SetAttribute mechanism only sets a context attribute if the user requesting the attribute value change is allowed to change the context attribute in question. For example, assume that a context attribute named "SecurityLevel" specifies the security level of the user. The SetAttribute mechanism may allow users to lower their SecurityLevel, but prevent them from raising it. Other context attributes, such as "session_id" and "user_id", may not be modified by the user under any circumstances.

According to another aspect of the invention, a mechanism is provided for dynamically appending predicates to queries received from a client. The appended predicates may or may not be in the form of GetContextValue predicates.

A policy routine determines which predicates to append to a particular query based on a variety of factors. Some of the factors may include the current value of one or more context attributes. For example, the policy routine may implement the following rules:

If the "today" context attribute equals Monday, Tuesday, Wednesday, Thursday or Friday, then append the predicate "where t.day=weekday"

If the "today" context attribute equals Saturday or Sunday, then append the predicate "where t.day=weekend"

Other factors used by the policy routine to determine the predicates to dynamically append to a query may include the type of database statement being processed. For example, the policy routine may append different predicates depending on whether the received database statement is a "select" statement or an "update" statement.

Context Attributes

Database servers receive commands and perform database operations in response to the received commands. Those commands, which include commands for updating, deleting, selecting and modifying data in the database, are collectively referred to herein as queries. Each of the queries received by the database server is associated with a context. The context to which a particular query belongs can have a significant effect on how the database server should respond to the query. For example, it may be appropriate for the database server to refuse to process a query received in one context, while the same query would have been processed in another context.

Examples of information that, taken collectively, makes up the context of a query include:

the session_id of the session in which a query is received the user_id of the user that initiated the session the type of access required by the query (insert, update, select, delete)

the type of application used to issue the query the IP address identified in the message containing the query the session environment (including the actual date/time, enabled roles, etc.)

This list is merely exemplary, the particular items of information that constitute the context of a query may vary from implementation to implementation. For the purpose of explanation, the individual information items within a context are referred to herein as context attributes.

According to one aspect of the invention, the database server maintains, for each session, context attribute values that reflect the current context of the session. According to one embodiment, these context attribute values are maintained in a portion of dynamic memory that is allocated to the session.

Defining and Setting Context Attributes

Unlike bind variables, the user is not free to set all of the context attribute values in an unrestricted manner. Rather, according to one embodiment, context attribute values may only be set by calling a server-side SetAttribute mechanism. The SetAttribute mechanism plays a critical role in the enforcement of the access control policy by selectively restricting access to the context attribute values based on a set of attribute access rules.

Figure 2:
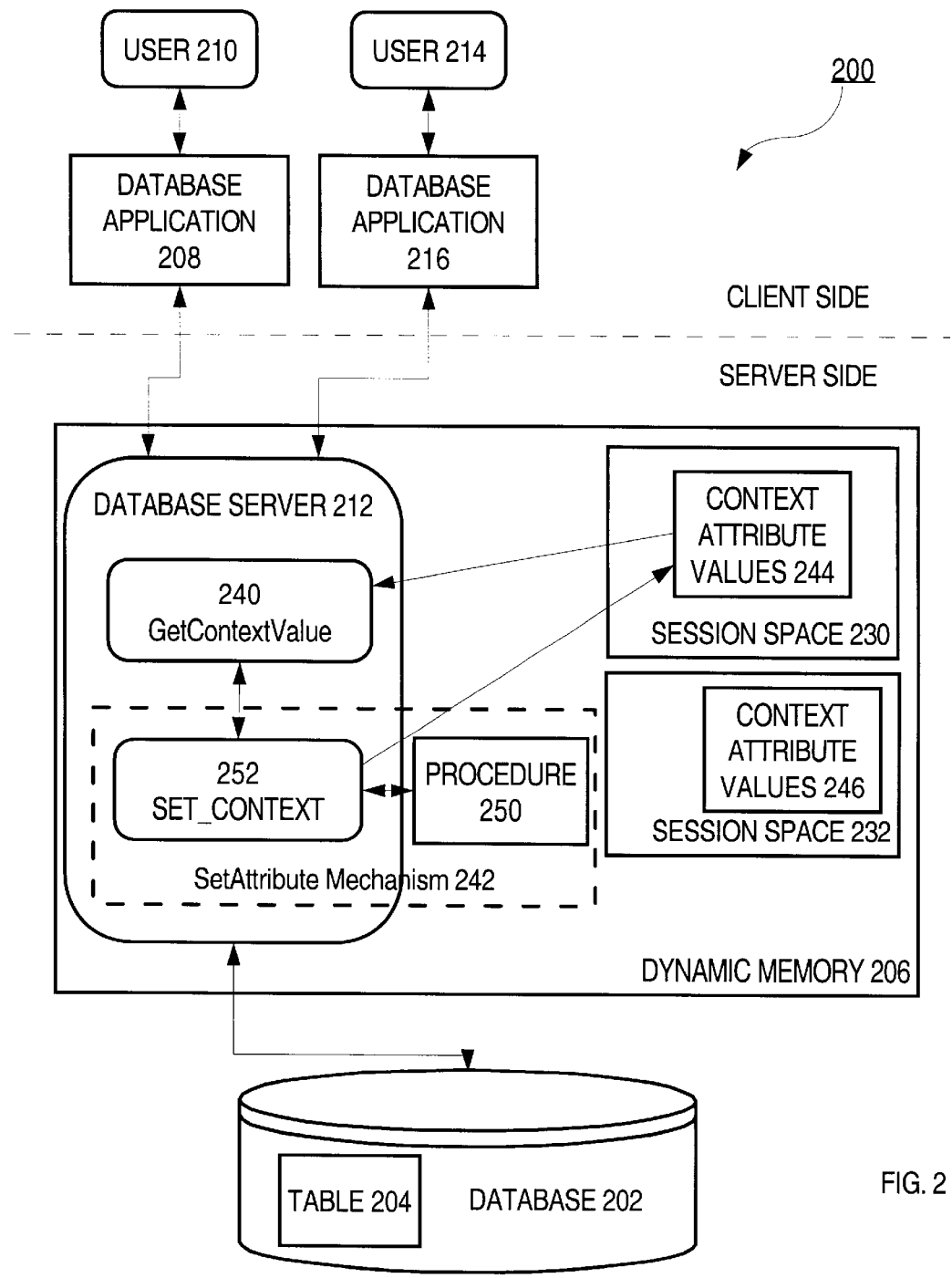
FIG. 2 is a block diagram of a database system that supports context attribute values according to an embodiment of the invention.

Referring to FIG. 2, it illustrates a database management system 200 configured according to an embodiment of the invention. Database management system 200 includes a database server 212 executing in dynamic memory 206. Database server 212 manages access to data within a database 202, which includes a table 204.

Database applications 208 and 216 interact with database server 212 in response to input from users 210 and 214, respectively. Such interactions involve issuing queries to database server 212, and receiving from database server 212 the results of the queries.

The interactions between database applications 208 and 216 and server 212 occur in the context of a session. A session is a specific connection of a user to a database server via a user process. For example, when a user starts a database application, the user typically provides a valid username and password. The username and password are sent from the database application to the database server and the database server establishes a session for the user. The session lasts from the time the user connects to the database server until the time the user disconnects from the database server (or exists the database application).

Upon establishing a session, database server 212 typically allocates a portion of memory to store information that pertains to the session. In the illustrated example, database server 212 has allocated session space 230 for the session initiated by user 210 via database application 208, and has allocated session space 232 for the session initiated by user 214 via database application 216.

According to one embodiment of the invention, the information maintained by database server 212 within session space 230 includes the context attribute values 244 associated with the session of user 210. Similarly, the information maintained in session space 232 includes the context attribute values 246 associated with the session of user 214. By storing the context attribute values in session memory, the overhead associated with contention-resolution mechanisms, such as lock managers, may be avoided because only processes associated with a session are allowed to access the session's space.

Some of the context attribute values of a session may be set by a user in an unrestricted manner. Others of the context attribute values of the session may be set by the user with certain restrictions. Yet others of the context attribute values of the session may not be set by the user at all. The context attribute values that a user is not allowed to set are referred to herein as primitive context attribute values. Primitive context values may include, for example, the user id, the session id and the actual system time.

The responsibility for enforcing the restrictions that apply to context attribute value modification falls on a server-side mechanism, shown in FIG. 2 as SetAttribute mechanism 242. According to one embodiment, the SetAttribute mechanism 242 includes a SET_CONTEXT routine 252 and a trusted stored procedure 250. The SET_CONTEXT routine 252 is responsible for setting context attribute values in response to calls from stored procedure 250. The stored procedure 250 is responsible for enforcing the access restrictions to the context attributes. For example, if stored procedure 250 is called by a user to set an attribute value that the user is not allowed to set, stored procedure 250 returns an error message. Only when the user calls procedure 250 to set an attribute that the user is allowed to set does the stored procedure 250 call SET_CONTEXT 252.

When SET_CONTEXT 252 is called, it does not immediately perform the context attribute value modification that is requested. Rather, SET_CONTEXT 252 first checks the calling stack of the trusted procedure 250 to verify that the call is actually coming from procedure 250. If the call is not coming from procedure 250, then SET_CONTEXT 252 does not perform the requested modification. If the call is from procedure 250, then SET_CONTEXT 252 performs the context attribute modification, as requested.

According to one embodiment, context attributes have multi-part names that have the form "namespace.attribute_name", where "namespace" is an identifier that is unique within database server 212. The "namespace" value itself may be a multi-part identifier. Each of the attribute names that are associated with a given namespace are also unique relative to the other attribute names associated with that same namespace.

According to one embodiment, the binding between a namespace and the trusted stored procedure responsible for setting the attributes values in the namespace is established when the namespace is created. According to an embodiment of the invention, the syntax of the command to create a namespace and bind it to a stored procedure is:

CREATE (OR REPLACE) CONTEXT <namespace>USING [<schema>.] <package_name>;

where package_name identifies the stored procedure responsible for calling SET_CONTEXT to set the values of attributes within the namespace. The database server 212 will only execute a CREATE CONTEXT command when the user issuing the command has the requisite database privileges. To ensure the security of the context attributes, only trusted users, such as the database administrators, are granted those privileges.

Figure 3:
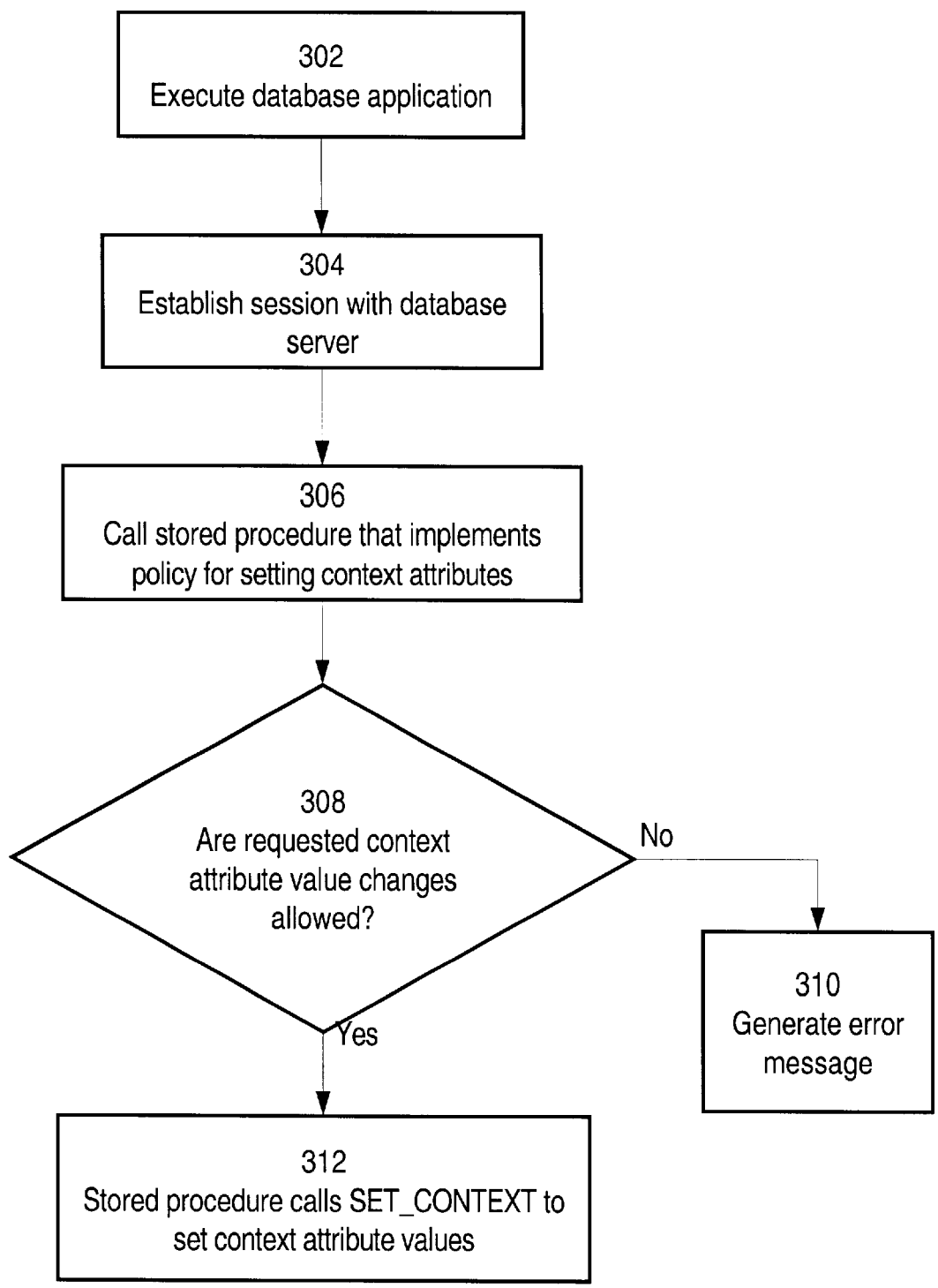
FIG. 3 is a flowchart that illustrates a typical sequence of events that results in the setting of context attributes, according to an embodiment of the invention.

The syntax of the calls made by the trusted procedure to the SET_CONTEXT routine is:

SET_CONTEXT(<namespace>, <attribute>, <value>);
Assume that a database administrator has used the CREATE CONTEXT command to create a set of attributes associated with the namespace "mysession", where the set of attributes include:
mysession.myapplication
mysession.application_state
mysession.language A typical sequence of events that results in the setting of these context attributes is shown in FIG. 3. Referring to FIG. 3, at step 302 user 210 begins executing database application 208. At step 304, database application 208 establishes a session with database server 212 in response to input from user 210. At step 304, database server 212 allocates session space 230 for the session with user 210.

At step 306, database application 208 calls stored procedure 250. The information sent by database application 208 to stored procedure 250 indicates that the name of the application is "APP1", the state of the application is "MainScreen", and that the screen currently displayed by the application is in English. In response to receiving this information, stored procedure 250 determines whether the myapplication, application_state, and language attributes are attributes that user 210 is allowed to set (step 308).

The logic employed by procedure 250 to make the determination at step 308 may vary in complexity depending on the security policy that protects the context attributes. For example, assume that the security policy is that a subset of context attributes may not be set by any user, and that all other context attributes may be set by any user. Under these conditions, the logic employed at step 308 would simply determine whether the call received from database application 208 is an attempt to modify one of the restricted context attributes.

A more complex security policy may require procedure 250 to take more elaborate actions at step 308. For example, a security policy may allow special classes of users to have special context modification privileges, or have special rules that govern certain types of context attributes. For example, a security_level attribute may have the rule that everyone except the CEO may only decrease the attribute value, but that the CEO may increase it. Under these conditions, any attempt to change the security_level attribute would cause procedure 250 to search the database to determine whether the current user is the CEO. If the current user is not the CEO, then procedure 250 reads the current value of the security_level attribute. If the current value of the security_level attribute is higher than the value specified in the attribute change request, then procedure 250 makes the call to SET_CONTEXT to perform the change. Otherwise, procedure 250 does not perform the change.

If at step 308 the stored procedure 250 concludes that the call was an attempt to modify an attribute that cannot be modified by user 210, then an error message is generated (step 310). Otherwise, control proceeds to step 312, where procedure 250 makes calls to SET_CONTEXT 252 to set the appropriate attribute values 244.

In the present example, it shall be assumed that user 210 is allowed to modify the "myapplication", "application_state", and "language" context attributes. Consequently, control proceeds to step 312 where procedure 250 makes the following three calls to SET_CONTEXT 252:

SET_CONTEXT(mysession, myapplication, APP1);
SET_CONTEXT(mysession, application_state, MainScreen);
SET_CONTEXT(mysession, language, English);

In response to these calls, the SET_CONTEXT routine 252 modifies context attribute values 244 by setting mysession.myapplication to APP1, mysession.application_state to MainScreen, and mysession.language to English.

According to one embodiment, database application 208 is designed to transmit context attribute change requests to procedure 250 in response to state changes that occur within database application 208. Typically, these requests will occur transparent to the user. For example, if database application 208 transitions from its main screen to a second screen in response to user input, database application 208 may send a request for the mysession.application_state attribute to be changed from MainScreen to SecondScreen.

In this manner, the context attribute values 244 can be maintained such that they always reflect the current state of application 208.

Server-Controlled Context Attributes

According to one embodiment of the invention, database server 212 maintains context attribute values associated with a predefined namespace that cannot by dropped or manipulated by any procedure. That predefined namespace, referred to herein as the USERENV namespace, is used for primitive attributes whose values are set and maintained by database server. The attributes included in the USERENV namespace may include, but are not limited to:

the identity of the logon user,
the IP address of the client,
the current date and numeric formats, and
the current schema name.

Context Predicates

According to one aspect of the invention, database server 212 implements a GetContextValue function 240 that returns the current value of a specified context attribute, or NULL if the specified context attribute has not been set. The syntax of a call to the GetContextValue function is:

GetContextValue(<namespace>, <attribute>)

According to one embodiment, database server 212 includes interfaces which allow the GetContextValue function 240 to be called both in procedural statements and in queries. An exemplary use of the GetContextValue function in a query is:

Q1:
SELECT * from t
WHERE t.lang=GetContextValue(mysession, language);

In query Q1, the GetContextValue function is used in a predicate that specifies a condition that must be satisfied by the rows returned by the query. For the purpose of explanation, predicates that include the GetContextValue function are referred to herein as context predicates, since the rows returned by the queries are determined in part by the context in which the queries are executed.

When used in a query, the GetContextValue function is evaluated in a manner similar to bind variables. Specifically, during query execution, database server 212 invokes GetContextValue function 240 to retrieve the current value of the attribute specified in the GetContextValue call. For example, assume that database application 208 issues query Q1 to database server 212. While database server 212 is executing query Q1, database server 212 calls GetContextValue function 240 to retrieve from context attribute values 244 the current value for the mysession.language context attribute. If the current value of the mysession.language attribute is English, then Q1 will be executed as if it read:

Q2:
SELECT * from t
WHERE t.lang='English';

Preferably, the GetContextValue expression is treated as a literal (constant). By treating the GetContextValue expression as a literal, the SQL processor can build a query plan on that basis, rather than, for example, having to assume that function evaluation is required on each row.

Using Context Predicates to Implement a Security Policy

According to one aspect of the invention, views with context predicates are used to implement security policies.

Similar to bind variables, the use of context predicates in view definitions can significantly decrease the number of views required to implement a security policy. However, because modification to context attributes is restricted in the manner described above, views with context predicates do not pose the same threat to security as bind variables. For example, consider the following two views:

V7:
   SELECT * from t
   WHERE t.security <=GetContextValue(mysession, security_level)

V8:
   SELECT * from t
   WHERE t.security <=BINDVAR

Assuming that BINDVAR is set to the same value as the security_level context attribute, both of these views would return the same rows. However, a malicious user could break the security policy by setting BINDVAR to a value associated with a security level that exceeds the user's actual security level. In contrast, the trusted stored procedure 250 that is bound to the mysession namespace would not allow a malicious user to increase the security_level context attribute. Further, attempt to circumvent the trusted stored procedure 250 by directly invoking the SET_CONTEXT routine 252 would fail because the SET_CONTEXT routine 252 would be able to tell from the calling stack that it was being called from something other than the trusted stored procedure 250.

Distributed Transactions

A distributed transaction is a transaction that requires work to be done by more than one database server. For example, assume that a first database server SRV1 manages one set of data, while a second database server SRV2 manages another set of data. A transaction that requires access to both sets of data would be "distributed" between the two database servers.

Typically, execution of a distributed transaction is coordinated by a "coordinator process", which is frequently executed in one of the database servers involved in the transaction. For example, a user will log on to a database server and submit to the database server commands that require work to be done by a different database server. The database server to which the user is connected (the "coordinating database server") sends messages to all other database servers that must participate in the transaction. Those servers perform the requested work and send results to the coordinating database server. The coordinating database server then presents the results to the user.

According to one embodiment of the invention, the coordinating database server includes context attribute values in the work request messages that it sends to the other database servers. The context attribute values sent by the coordinating database server may include some or all of the context attribute values that the server is maintaining for the session in which the work is requested. The database servers that receive the context attribute values may then access the context attribute values when the work they are requested to perform involves the execution of queries that have context predicates.

Dynamic Predicate Attachment

While context attributes and context predicates reduce the number of views required to enforce access control policies, some access control policies may still require numerous views. In addition, there remains the security problem associated with users that circumvent the views to access the table data directly, thus circumventing the mechanism through which the control access policy is enforced.

According to one aspect of the invention, these issues are addressed through a technique referred to herein as dynamic predicate attachment. Dynamic predicate attachment involves selectively adding predicates to queries that access database objects, such as tables and views. For example, a database application may issue the query:

Q3:
   SELECT * from t

In response to receiving a query that accesses table t, the database server 212 invokes a policy function that has been bound to table t. The policy function then selectively adds one or more predicates to the received query. For example, the policy function may append the predicate "WHERE t.lang=GetContextValue(language)" to query Q3, thus producing the following query:

Q4:
   SELECT * from t
   WHERE t.lang=GetContextValue(language)

In this example, the predicate appended to the received query restricts the rows selected by the query to those rows of table t where the value in the "lang" column equals the current value of the "language" context attribute.

The logic implemented in the policy function to determine which predicates, if any, should be appended to incoming queries may be arbitrarily complex. Thus, even complex access control policies may be implemented with relative ease, without having to create, use, and maintain specialized views to implement the policies.

For example, assume that the access policy of table t is that everyone is allowed to see all of the records in their own department, but can only modify the records that apply to themselves. Further, assume that access to table t is only allowed on weekdays (Monday–Friday), unless the access is performed by a database administrator. The logic used by the policy function that implements this policy could be:

```
if GetContextValue(access_type) = modify then
      add_predicate("t.user_id = GetContextValue(user_id)")
else
      add_predicate("t.dept_no = GetContextValue(dept_id);
if    ((GetContextValue(today) = Saturday) or
      (GetContextValue(today) = Sunday)) and
      (GetContextValue(user_type) <> dba) then
      add_predicate("1 = 2");
```

Significantly, this technique is able to take advantage of context attributes both to specify the conditions for appending predicates, and in the predicates that are appended. For example, assume that a user that is not a database administrator submits query Q3 on a Friday. The policy function for table t would attach predicates according to the logic listed above to produce the following query:

Q5:
   SELECT * from t
   WHERE t.dept_no=GetContextValue(dept_id)

The same query issued by the same user on a Saturday would produce the following query:

Q6:
   SELECT * from t
   WHERE t.dept_no=GetContextValue(dept_id) AND 1=2

In this query the predicate 1=2 will always evaluate to FALSE, so no rows will be returned by the query. This is consistent with the policy that access to table t is not allowed to general users on Saturdays and Sundays.

Because the current value of context attributes are available to policy functions, it is possible for policy functions to append predicates that contain constant values instead of context predicates. For example, rather than append the predicate "t.dept_no=GetContextValue(dept_id)" to produce query Q5, the policy function may itself make the call GetContextValue(dep_id) to determine that the current value of the dept_id context attribute is 50. The policy function may then append the predicate "t.dept_no=50" to the incoming query, to produce the query:

Q7:
SELECT * from t
WHERE t.dept_no=50.

Execution of query Q7 will produce results identical to query Q5, but for efficiency purposes the format of Q5 is generally preferable. Specifically, database servers frequently attempt to optimize execution of a query by using an execution plan that has already been created for an identical, previously received query. When queries have predicates with constant values, such as "t.deptno=50", they are less likely to match previously received queries than queries with predicates that do not use constant values, such as "t.dept_no=GetContextValue(dept_id)".

According to one embodiment of the invention, the policy function that is bound to a table is invoked when a query accesses data in the table, regardless of the access path used by the query. For example, a particular query may retrieve data through a first view, where the first view retrieves data through a second view, where the second view retrieves data from table t. Under these conditions, the database server will determine that table t is being accessed at the time the particular query is being parsed. Upon detecting that table T is being accessed, the database server invokes the policy function that is bound to table t.

Policy Function for Views

According to one embodiment of the invention, policy functions may be bound to views as well as tables. Consequently, when a user accesses a table through a view, the query issued by the user may have one set of predicates attached by the policy function associated with the view, and another set of predicates attached by the policy function associated with the table.

In addition to attaching predicates to queries, policy functions may be configured to set context attributes. For example, assume that a view Vx is created which selects only the unclassified columns of a table t. Under these conditions, the policy function associated with Vx may set the value of an "access_path" attribute to Vx. The policy function associated with table t itself may be configured to attach a restrictive predicate to all queries unless the access_path attribute equals Vx. Under these conditions, the rows made available to users are restricted when the users access the table t through a path other Vx, and the columns available to users are restricted when users access table t through Vx.

Policy Function Implementation

Policy functions can be implemented in a variety of ways. According to one embodiment, policy functions are implemented as stored procedures which are associated with a policy for a table or view through an administrative interface. As illustrated above, a policy function can produce a filtering predicate for a particular table of view object based on the current state of the user session. A policy function can also be used to mark the state transition with application context for subsequent database access control.

A system package may be used to provide the interface through which policy functions may be administered. According to one embodiment, the interface to such a package is as follows:

```
PROCEDURE add_policy (object_schema  IN VARCHAR2  :=NULL,
                      object_name    IN VARCHAR2,
                      policy_name    IN VARCHAR2,
                      function_schema IN VARCHAR2 :=NULL,
                      policy_function IN VARCHAR2,
                      statement_types IN VARCHAR2 :=NULL,
                      update_check   IN BOOLEAN   :=FALSE,
                      enable         IN BOOLEAN   :=TRUE);
object_schema    schema owning the table/view, current schema
                 if NULL.
object_name      name of table or view.
policy_name      name of policy, must be unique within the same
                 object
function_schema  schema of the policy function, current schema
                 if NULL.
policy_function  function to generate predicates for this policy.
statement_types  statement type that the policy apply, default
                 is any.
update_check     TRUE if policy is checked against updated or
                 inserted value.
enable           TRUE if policy is enabled after created
PROCEDURE drop_policy (object_schema  IN VARCHAR2 :
                                       =NULL;
                       object_name    IN VARCHAR2,
                       policy_name    IN VARCHAR2);
object_schema    schema owning the table/view, current
                 schema if NULL.
object_name      name of table or view.
policy_name      name of policy to be dropped.
PROCEDURE enable_policy (object_schema IN VARCHAR2 :
                                        =NULL,
                         object_name   IN VARCHAR2,
                         policy_name   IN VARCHAR2,
                         enable        IN BOOLEAN);
object_schema    schema owning the table/view, current
                 schema if NULL.
object_name      name of table or view.
policy_name      name of policy to be enabled or disabled.
enable           TRUE to enable the policy,
                 FALSE to disable the policy.
PROCEDURE refresh_policy (object_schema IN VARCHAR2 :
                                         =NULL,
                          object_name   IN VARCHAR2 :
                                         =NULL,
                          policy_name   IN VARCHAR2 :
                                         =NULL);
object_schema    schema owning the table/view, current
                 schema if NULL.
object_name      name of table or view.
policy_name      name of policy to be refreshed.
```

When the ADD_POLICY procedure is executed, a policy is created for a table or view. The statement_type argument specifies a list of statement types for which the policy should be enforced. It can be any combination of SELECT (including subqueries), INSERT, UPDATE, and DELETE. If it is null, then the policy will be enforced on all statement types. The policy_name is used to identify the policy and must be unique relative to other policies on the same object. By default, a policy is enabled when it is created. The enable argument can be used to create a disabled policy. The procedure ENABLE_POLICY can be used to enable a disabled policy whenever the policy is required. Policies are normally enforced only for query access; the optional update_check argument can be set to TRUE to make the server check the policy against inserted or updated values as well (the default is FALSE).

Whenever any of the administrative procedures ADD_POLICY, DROP_POLICY, or ENABLE_POLICY is executed, statements in memory associated with the object protected by the policy will be invalidated and re-parsed to ensure that they enforce the changes. There is also a REFRESH_POLICY command that can be used to force an invalidation and re-parse for a particular object, or (if no specific object is specified), to cause a systemwide invalidation of statements affected by security policies. This is particularly useful for time-sensitive security policies. For example, a database administrator could use a scheduled program to issue REFRESH_POLICY at a preset time, guaranteeing that SQL statements would be re-parsed to pick up a group of policies (an example might be to disable insert/update/delete activity after 5 pm).

Users must have execute privilege on the system package in order to manage policies. However, users who are accessing the tables or views protected by policies do not need to have execute privilege on the policy function, because the server will execute the function on behalf of the function's owner (definer). If a dynamic predicate contains subqueries, security check for objects within the subqueries will be performed against the owner of the policy function, not the owner of the table or view, nor the user who is issuing the statement. The extra filtering activities are completely transparent to the end users and to the owner of the table or view.

Variations

In the embodiments described above, numerous specific details were given for the purpose of explanation. However, the present invention is not limited to those specific details. For example, the embodiment illustrated in FIG. 2 stores the context attribute values that are associated with a session in an area of memory that is dedicated to the session. However, the context attribute values for a session may be stored elsewhere. For example, the context attribute values for all sessions may be stored in a shared buffer cache, the access to which is governed by a lock manager. Alternatively, the context attribute values may themselves be stored in tables.

Similarly, FIG. 2 shows an embodiment in which virtually all components that implement the invention are located on the server-side of the database system. Alternatively, many of those components may be delegated to the client-side of the database system, potentially resulting in an increase of the scalability of the system.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for accessing data, the method comprising the steps of:
   storing values for a set of context attributes;
   appending to a query a predicate that identifies a function, wherein the function has an input parameter that identifies a particular context attribute from the set of context attributes; and
   executing the query as if the predicate specified the value associated with the particular context attribute.

2. The method of claim 1, wherein the particular context attribute is associated with a date, and the step of executing the query includes executing the query as if the predicate specified the date.

3. The method of claim 1, wherein the particular context attribute is associated with a time, and the step of executing the query includes executing the query as if the predicate specified the time.

4. The method of claim 1, wherein the particular context attribute is associated with a type of application, and the step of executing the query includes executing the query as if the predicate specified the type of application.

5. A method for accessing data, the method comprising the steps of:
   storing values for a set of context attributes;
   providing an attribute accessing mechanism that accesses the set of context attributes;
   executing a policy function to determine the current value of a particular context attribute from the set of context attributes by invoking the attribute accessing mechanism; and
   appending the current value to a predicate of a query.

6. A method of accessing data, the method comprising the steps of:
   storing values for a set of context attributes;
   providing an attribute setting mechanism that selectively restricts access to the set of context attributes based on a policy; and
   enforcing the policy based at least in part on whether a statement in a query is at least one of SELECT, INSERT, UPDATE, and DELETE statement.

7. The method of claim 6, wherein the statement is a SELECT statement, and the step of enforcing the policy is based at least in part on the fact that the statement is a SELECT statement.

8. The method of claim 6, wherein the statement is an INSERT statement, and the step of enforcing the policy is based at least in part on the statement being an INSERT statement.

9. The method of claim 6, wherein the statement is an UPDATE statement, and the step of enforcing the policy is based at least in part on the statement being an UPDATE statement.

10. The method of claim 6, wherein the statement is a DELETE statement, and the step of enforcing the policy is based at least in part on the statement being a DELETE statement.

11. A method for a plurality of participating database servers participating in a distributed transaction to access data, the method comprising the steps of:
   storing values for a set of context attributes within a participating database server of said plurality of participating database servers;
   providing an attribute setting mechanism that selectively restricts access to the set of context attributes based on a policy;
   each participating database server of the plurality of database servers accessing data by performing the steps of:
      executing a query that contains a reference to one or more of the context attributes; and
      processing the query based on current values of the one or more of the context attributes.

12. A computer-readable medium carrying instructions for accessing data, the instructions comprising instructions for performing the steps of:
   storing values for a set of context attributes;
   appending to a query a predicate that identifies a function, wherein the function has an input parameter that identifies a particular context attribute from the set of context attributes; and executing the query as if the predicate specified the value associated with the particular context attribute.

13. The computer-readable medium of claim 12, wherein the particular context attribute is associated with a date, and the step of executing the query includes executing the query as if the predicate specified the date.

14. The computer-readable medium of claim 12, wherein the particular context attribute is associated with a time, and the step of executing the query includes executing the query as if the predicate specified the time.

15. The computer-readable medium of claim 12, wherein the particular context attribute is associated with a type of application, and the step of executing the query includes executing the query as if the predicate specified the type of application.

16. A computer-readable medium for accessing data, the instructions comprising instructions for performing the steps of:

storing values for a set of context attributes;

providing an attribute accessing mechanism that accesses the set of context attributes;

executing a policy function to determine the current value of a particular context attribute from the set of context attributes by invoking the attribute accessing mechanism; and appending the current value to a predicate of a query.

17. A computer-readable medium for accessing data, the instructions comprising instructions for performing the steps of:

storing values for a set of context attributes;

providing an attribute setting mechanism that selectively restricts access to the set of context attributes based on a policy; and enforcing the policy based at least in part on whether a statement in a query is at least one of SELECT, INSERT, UPDATE, and DELETE statement.

18. The computer-readable medium of claim 17, wherein the statement is a SELECT statement, and the step of enforcing the policy is based at least in part on the statement being a SELECT statement.

19. The computer-readable medium of claim 17, wherein the statement is an INSERT statement, and the step of enforcing the policy is based at least in part on the statement being an INSERT statement.

20. The computer-readable medium of claim 17, wherein the statement is an UPDATE statement, and the step of enforcing the policy is based at least in part on the statement being an UPDATE statement.

21. The computer-readable medium of claim 17, wherein the statement is a DELETE statement, and the step of enforcing the policy is based at least in part on the statement being a DELETE statement.

22. A computer-readable medium for a plurality of participating database servers participating in a distributed transaction to access data, the instructions comprising instructions for performing the steps of:

storing values for a set of context attributes within a participating database server of said plurality of participating database servers;

providing an attribute setting mechanism that selectively restricts access to said set of context attributes based on a policy;

each participating database server of the plurality of database servers accessing data by performing the steps of:

executing a query that contains a reference to one or more of the context attributes; and processing the query based on current values of the one or more of the context attributes.

23. A method for executing a query issued to a database server by a database client, the method comprising the steps of:

said database server receiving said query;

transparently to said database client and prior to the database server executing said query:

said database server detecting that said query requires access to a database object, and in response to detecting that said query requires access to said database object:

said database server creating a modified query by selectively adding one or more predicates to said query; and executing, within said database server, said modified query to access data managed by said database server.

24. The method of claim 23 wherein:

the database server maintains values for a plurality of context attributes; and the database server determines which predicates to add to said query based at least in part on current values of one or more of said plurality of context attributes.

25. The method of claim 24, wherein the step of adding one or more predicates includes adding at least one predicate that references said one or more of said plurality of context attributes.

26. A computer-readable medium carrying one or more sequences of instructions which, when executed by one or more processors, causes the one or more processors to perform the method recited in claim 25.

27. A computer-readable medium carrying one or more sequences of instructions which, when executed by one or more processors, causes the one or more processors to perform the method recited in claim 24.

28. The method of claim 23, wherein:

said database object is a view that requires access to a particular table; and wherein said one or more predicates reference an attribute of said particular table.

29. A computer-readable medium carrying one or more sequences of instructions which, when executed by one or more processors, causes the one or more processors to perform the method recited in claim 28.

30. The method of claim 23 wherein:

the database object is a table;

the query accesses the table through a view; and said database server, based on said query accessing the table through said view, performs the step of selectively adding one or more predicates.

31. A computer-readable medium carrying one or more sequences of instructions which, when executed by one or more processors, causes the one or more processors to perform the method recited in claim 30.

32. The method of claim 23, wherein the steps that are performed transparently to said database client and prior to the database server executing said query include:

invoking a function that said database server associates with said database object but not with other database objects managed by said database server; and said function generating the one or more predicates to add.

33. A computer-readable medium carrying one or more sequences of instructions which, when executed by one or more processors, causes the one or more processors to perform the method recited in claim 32.

34. The method of claim 32, wherein:

the method further includes invoking an administrative interface; and wherein invoking said administrative interface causes said database server to generate data that associates said function with said database object.

35. A computer-readable medium carrying one or more sequences of instructions which, when executed by one or more processors, causes the one or more processors to perform the method recited in claim 34.

36. A computer-readable medium carrying one or more sequences of instructions which, when executed by one or more processors, causes the one or more processors to perform the method recited in claim 23.

37. A method for executing a query issued to a database server by a database client, the method comprising the steps of:

invoking an administrative interface supported by the database server;

wherein invoking said administrative interface causes said database server to generate data that associates a function with a database object;

storing values for a set of context attributes within the database server;

providing, within said database server, an attribute setting mechanism that governs access to said set of context attributes;

the database server receiving the query from the database client;

detecting that the query requires access to the database object;

transparently to said database client and prior to the database server executing said query, invoking one or more functions associated with said database object, wherein said one or more functions includes said function;

wherein invoking said function causes the attribute setting mechanism to change a value of said set of context attributes; and processing said query based on current values of said set of said context attributes.

38. A computer-readable medium carrying one or more sequences of instructions which, when executed by one or more processors, causes the one or more processors to perform the method recited in claim 37.

* * * * *